United States Patent [19]

Roe et al.

[11] 4,410,599

[45] Oct. 18, 1983

[54] COMPOSITIONS FOR REDUCING THE FREEZE-ADHERENCE OF PARTICULATE MINERALS TO THE WALLS OF TRANSPORT BINS AND THE LIKE

[75] Inventors: William J. Roe, Aurora; Jacqueline L. Perisho, Oak Park, both of Ill.

[73] Assignee: Nalco Chemical Company, Oak Brook, Ill.

[21] Appl. No.: 355,903

[22] Filed: Mar. 8, 1982

[51] Int. Cl.$^3$ .................. B32B 15/04; B32B 15/08; B22B 15/18
[52] U.S. Cl. .................. 428/469; 428/457; 524/401; 524/436
[58] Field of Search .................. 524/401, 428, 436; 428/469, 457

[56] References Cited

FOREIGN PATENT DOCUMENTS 53-55213  5/1978  Japan .................. 524/436

OTHER PUBLICATIONS

Union Carbide Brochure, F-44029C, 3/81-5M, pp. 1-30.

Primary Examiner—Allan Lieberman
Attorney, Agent, or Firm—John S. Fosse

[57] ABSTRACT

A side-release composition for use in facilitating the discharge of a frozen cargo of particulate mineral material comprises brine and a sufficient amount of polymeric ethylene oxide in the brine to form a gel upon exposure to temperatures of less than about 65° F.

5 Claims, No Drawings

COMPOSITIONS FOR REDUCING THE FREEZE-ADHERENCE OF PARTICULATE MINERALS TO THE WALLS OF TRANSPORT BINS AND THE LIKE

FIELD OF THE INVENTION

This invention relates in general to chemical specialty products and in particular to chemical compositions for reducing the freeze-adherence of particulate minerals to the walls of transport bins.

BACKGROUND OF THE INVENTION

Appreciable quantities of unwanted moisture are commonly included with a variety of bulk mineral cargos, resulting in such undesirable effects as reduction in fuel value, caking, lumping, and freeze-adherence to the metal walls of both storage and transport bins in the wintertime. In the past, dewatering of the mineral product has been undertaken in an effort to alleviate these problems; and both chemical and mechanical means have been employed for this purpose. In addition, various release agents have been proposed heretofore for spraying or otherwise applying onto the inside walls of empty railroad cars and the like in an effort to prevent coal and kindred products from freezing to these surfaces during subsequent sub-zero shipment and thereafter presenting difficulties in unloading.

The prior art freeze-adherence suppression agents, however, have proved capable of only partially reducing the amount of force required to free a coal or like product which had frozen within its conveyance.

SUMMARY OF THE INVENTION

The present invention overcomes the limitations of the prior art by taking advantage of the unique properties of certain polymeric ethylene oxides in formulating a composition which substantially completely prevents coal and like mineral products from freezing to the walls of railroad hopper and gondola cars. The selected poly(ethylene oxide) is formulated with a brine solution; and the resultant liquid is applied to the cold inside surfaces of an empty transport bin, for example, where it forms a creamy, adherred gel. Subsequently loaded mineral product is prevented from freezing to the bin wall by this gel coating. The compositions of the invention are additionally advantageous in that warming to temperatures above about 70°-80° F. converts the gel to a sol which can be readily hosed from the hopper walls. Spray application in the sol state is also readily feasible.

Accordingly, a general object of the present invention is to provide a new and improved composition for preventing the freeze-adherence of particulate mineral products to the walls of transport containers.

Another object of the invention is to provide a sidewall release agent which accomplishes substantially complete dumping of a frozen coal cargo upon inverting the loaded railroad car.

These and other objects and features of the invention will become apparent from a consideration of the following descriptions.

DETAILED DESCRIPTION OF THE INVENTION

In accordance with the principles of the present invention, side-release agents are formulated by adding a small amount of polymeric ethylene oxide to a brine; and advantage is taken of the unique interaction between the components of the resultant compositions to provide a product which greatly assists the complete discharge of a frozen cargo of such particulate minerals as coal and crushed limestone from railroad hopper cars or the like. The poly(ethylene oxide) component functions by selectively forming a hydrated, enclosing phase for the brine; and the brine acts to lower the thermal gelation point of the poly(ethylene oxide) from near the boiling point in pure water to a value approximating normal room temperature.

The poly(ethylene oxide) component of the instant compositions is a homopolymer usefully having a molecular weight of from about 100,000 to about 600,000. The molecular weight of the poly(ethylene oxide) component is selected in combination with the particular composition of the brine component such that the resultant composition exhibits a gel point of less than about 65° F. and preferably less than about 40° F. The polymeric ethylene oxide component is incorporated in the brine between about 0.2% and about 3.0% by weight of the brine; and compositions with eminently useful combinations of properties contain between about 0.7% and about 1.0% by weight of the poly(ethylene oxide) component. The latter compositions display sufficient viscosity to adhere well to the metal walls of transport bins and the like, without being excessively viscous so as to inhibit easy spraying. The solubility of the poly(ethylene oxide) in the brine is comparatively insensitive to the pH of the brine; and brines having pH within the range of from about 2 to about 12 are acceptable in the practice of the invention. Under ordinary circumstances, potable water is usefully employed in making the brine.

In making brines for use in the practice of the invention, the salt is selected to be one highly soluble in water; and as a consequence, chlorides are preferred although nitrates can be employed. Calcium, potassium, sodium and magnesium chloride have proved eminently useful in the practice of the invention; and brines having salt concentrations of from about 10% to about 35% by weight are acceptable. Salt concentrations in the higher end of the range are generally preferred in order to optimize the antifreeze effects of the instant compositions, without however, incurring instability of the gel which is to be formed.

The instant compositions are readily applied as pregelled solutions at poly(ethylene oxide) levels of 0.3–0.7%. However, in order to provide a thicker and more resilient protective coating, polymer levels of 0.7–3.0% are necessary. In such cases, and in order to avoid the expense and inconvenience of maintaining feed tanks and spraying equipment at temperatures above the gelation point, the poly(ethylene oxide) component and the brine component may be held separately and combined in appropriate proportion at a mixing and dispensing nozzle at the time of application.

In order to describe the invention more fully, the following specific examples are given without, however, limiting the invention to the precise details and conditions described.

EXAMPLE 1

A solution was prepared comprising 69% by weight warm water, 29% by weight magnesium chloride and 1% of polymeric ethylene oxide having an average molecular weight of 100,000. This solution gelled instantly when sprayed onto a mild steel plate held at 40°

F. There was no run-off of the liquid, in that it has formed a thick, white, adherent gel upon contact with the cold metal.

Mild steel cylinders were next treated with the solution described immediately hereinabove and then packed with wet coal and frozen, the coal having been sized to represent the fraction passing throughout the mesh of a ½-inch screen. The frozen samples were evaluated by measuring the pressure that was required to extrude the frozen coal from the cylinders. For coal having an initial moisture content of 7.7% by weight, application of the composition of the invention reduced the compressive force required to extrude the frozen coal from the tube 91.8% relative to a control sample without any antifreeze treatment. Using coal with an initial moisture content of about 12%, on the other hand, a reduction in force to extrude was noted to be 92.6% in comparison with the control. These results compare with force reduction values in the range of 75-85% for a different release agent.

EXAMPLE 2

A miniature, bottom-dumping hopper car was used in a battery of tests in which the sides of the car were "painted" at a dosage rate of 0.16 gallons/100 ft.$^2$ with the side-release agent of Example 1, or left untreated. Moist coal was then added to the car and frozen at 0° F. for one hour. The frozen car was then subjected to vigorous, controlled vibration for one minute and the bottom doors opened to release the coal. Dumping by inversion of the hopper car was also investigated.

The collected data is set forth in Table 1 below where, it will be noted, inversion of the cars treated with the composition of the invention resulted in almost complete release of the coal while the untreated coal cars permitted no release upon inversion. In addition, treatment with the composition of the invention markedly improved the percentage of the coal dumped through the bottom of the hopper at all coal moisture levels investigated.

TABLE 1

| HOPPER CAR TEST RESULTS | | | | |
|---|---|---|---|---|
| Coal Size Consistency | Coal Moisture | Side Treatment | Percentage Of Coal Dumped Through Bottom Of Hopper | Percentage Of Total Load Dumped Upon Inversion Of Hopper Car |
| −½" | 7.7% | None | 15.95% | — |
| −½" | 7.7% | Example 1 | 37.50% | — |
| −½" | 12.0% | None | 5.75% | None |
| −½" | 12.0% | Example 1 | 12.40% | 90% |
| −½" | 17.7% | None | 5.40% | None |
| −½" | 17.7% | Example 1 | 10.55% | 100% |

The specific examples herein shown and described are to be considered as being primarily illustrative. Various changes beyond those described will, no doubt, occur to those skilled in the art; and such changes are to be understood as forming part of this invention insofar as they fall within the spirit and scope of the appended claims.

The invention is claimed as follows:

1. The method of reducing the freeze-adherence of coarse mineral particles to the metal surfaces of shipping containers and the like, which method comprises the step of applying to said surfaces a coating composition comprising brine and a sufficient amount of polymeric ethylene oxide in said brine to form a gel upon exposure to temperatures of less than about 65° F., wherein said brine is a water solution of an alkali metal or alkaline earth metal salt, wherein said salt is present in said brine in a concentration of about 10% to about 35% by weight, wherein said polymeric ethylene oxide is a homopolymer having a molecular weight of between about 100,000 and about 600,000, and wherein said polymeric ethylene oxide is present in said brine in a concentration of between about 0.2% and about 3.0% by weight.

2. The method according to claim 1 wherein said salt is a chloride.

3. The method according to claim 2 wherein said chloride is magnesium chloride.

4. The method of reducing the freeze-adherence of coarse mineral particles according to claim 1 wherein said composition is applied when said surfaces are at a temperature of less than about 40° F.

5. The method of reducing the freeze-adherence of coarse mineral particles according to claim 1 wherein said brine and said polymeric ethylene oxide are stored separately and mixed together at a delivery nozzle at the time of application to said surfaces.

* * * * *